(No Model.)  2 Sheets—Sheet 1.

W. EBERHARD.
GRAIN CUTTING MACHINE.

No. 301,700.  Patented July 8, 1884.

Attest
J. L. Parsons
Geo. F. Robinson

Inventor
William Eberhard
by Bradford Howland
Attorney

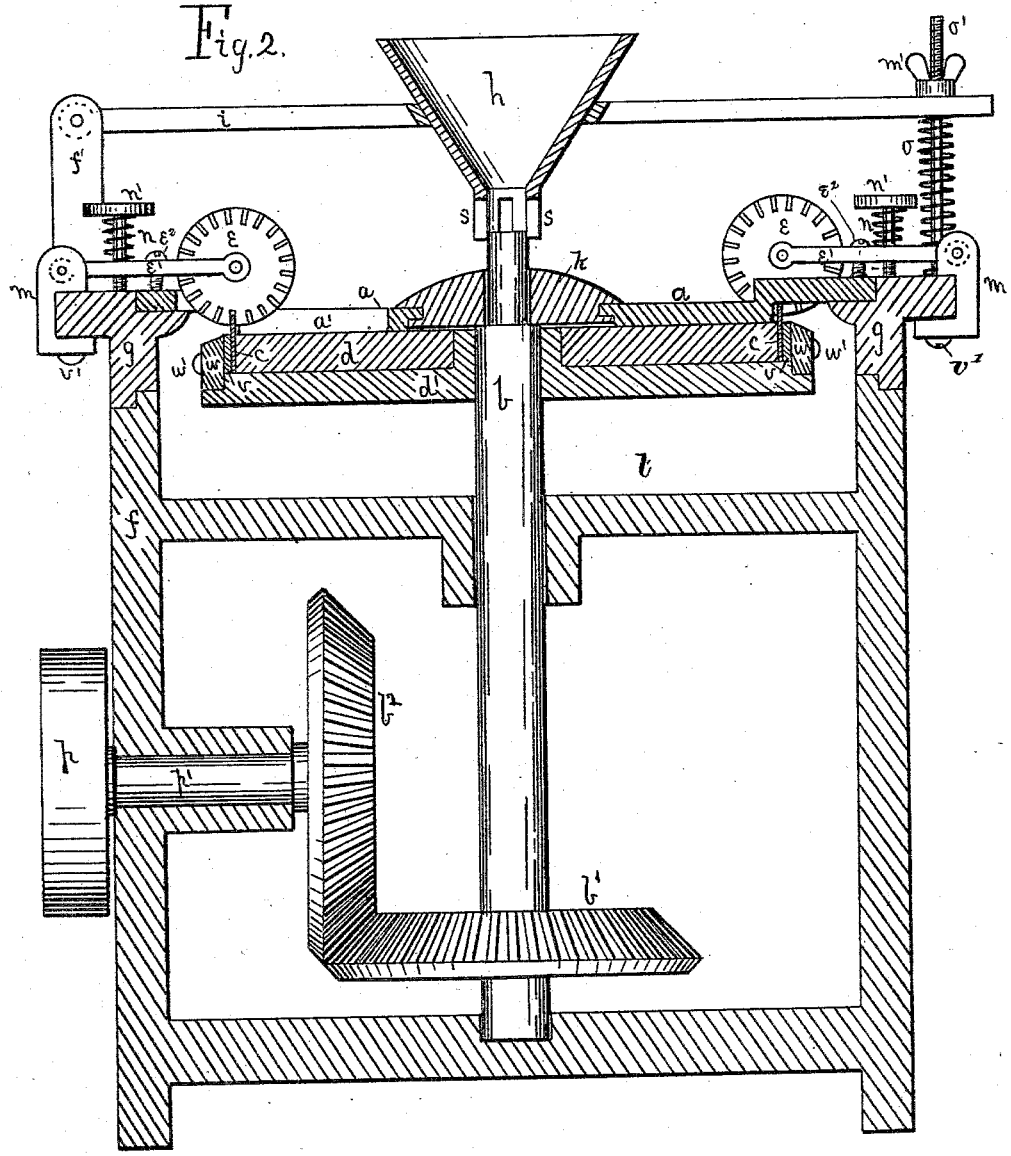

UNITED STATES PATENT OFFICE.

WILLIAM EBERHARD, OF AKRON, OHIO, ASSIGNOR OF ONE-HALF TO GEORGE T. FORD, OF SAME PLACE.

GRAIN-CUTTING MACHINE.

SPECIFICATION forming part of Letters Patent No. 301,700, dated July 8, 1884.

Application filed March 12, 1884. (No model.)

*To all whom it may concern:*

Be it known that I, WILLIAM EBERHARD, a citizen of Akron, Summit county, Ohio, have invented a new and useful Improvement in Grain-Cutting Machines, of which the following is a specification.

The main features of my invention consist of, first, a stationary feeder formed with slots inclined to its radius, in combination with a horizontally-rotating knife-carrier beneath the feeder, and closing the bottom of its slots; and, second, a roller in each slot to aid in feeding the kernels to the knives which are on the circumference of the carrier, and, by passing in an inclined position through grooves across the periphery of the roller, turn the latter.

Figure 1:
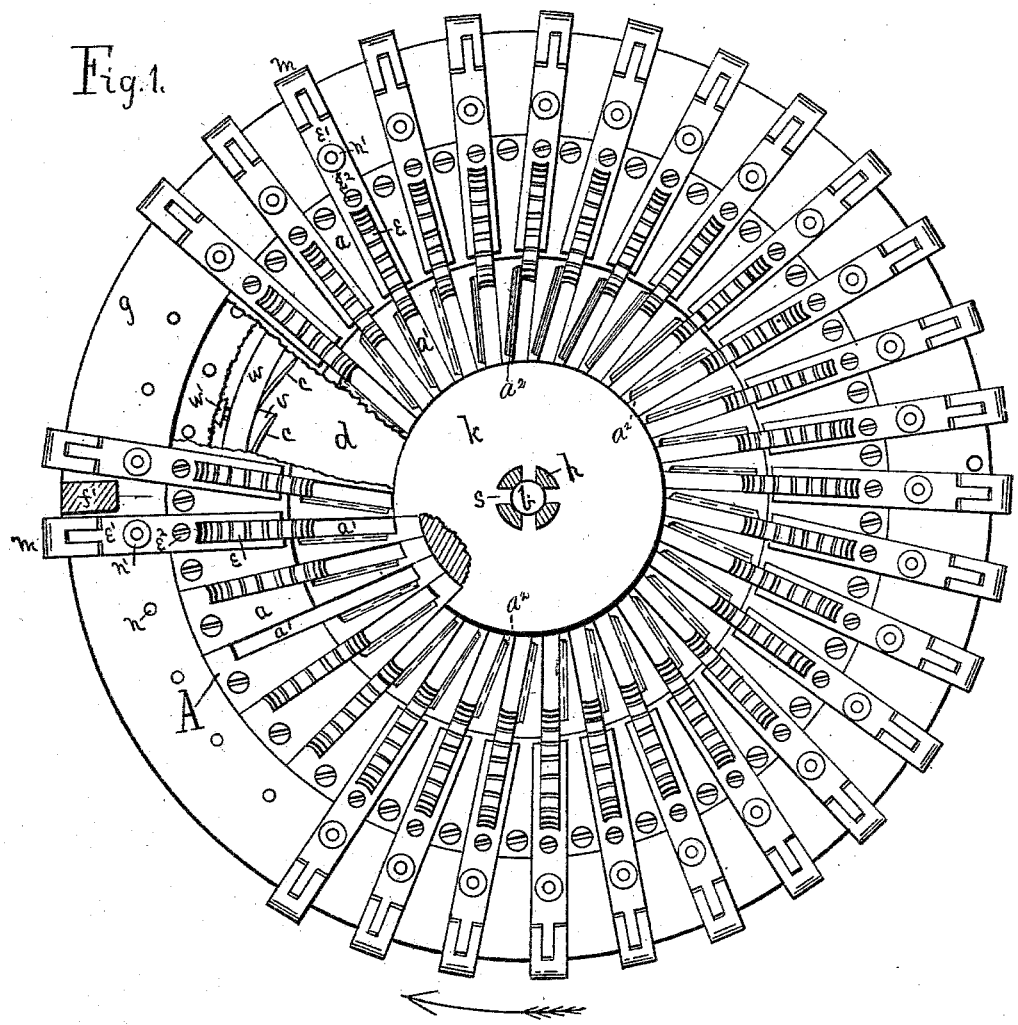
Figure 3:
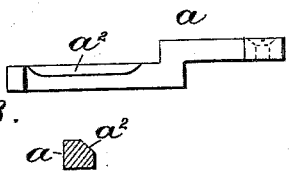

In the drawings forming a part of this specification, Figure 1 is a plan of the machine with parts of it broken away, and Fig. 2 is a vertical section. Fig. 3 represents a side view and a cross-section of one of the bars $a$.

The feeder A is formed of a series of bars, $a$, which are recessed or cut away on one side, to form, when in contact with each other, slots $a'$, of sufficient width to permit the kernels to slide in them endwise. These bars are placed side by side, their outer ends being bolted to ring $g$, which rests on frame $f$. The inner ends of bars $a$ are supported in a circumferential groove in collar $k$, which loosely surrounds shaft $b$. Feeder A may, if preferred, be made of a single piece of metal formed with slots $a'$, instead of bars $a$, and in that case collar $k$ will be unnecessary, as the feeder itself could extend to and surround the shaft $b$; but I think it can be more easily and cheaply made and adjusted to other parts in the form of separate bars $a$. The side of each slot $a'$ opposite the direction of rotation of knife-carrier $d$ is beveled at $a^2$, to facilitate the adjustment of kernels in the slots. Carrier $d$ is supported on disk $d'$, and rotates with it in the direction shown by an arrow in Fig. 1, by means of wheels $b'$ $b^2$, shaft $p'$, pulley $p$, and shaft $b$. Disk $d'$ is keyed to shaft $b$. Shaft $b$ is supported by and rotates in frame $f$. Cutters or knives $c$ are placed in an inclined position at the circumference of carrier $d$, where they are held in place by means of wedge-shaped pieces $v$ and ring $w$ and set-screws $w'$. Rollers $e$ are supported and rotate in hinged arms $e'$. Each roller extends down nearly to the bottom of slot $a'$, and is grooved across its face to receive in succession the inclined cutters $c$, which pass through the grooved periphery of the roller, and thereby rotate the latter. The inclination of cutters $c$ is such that the front or edge of each cutter is inward from the rear of the next preceding cutter a dstance equal to the length of the particles of meal into which the kernels of oats or other grain is to be cut. Each arm $e'$ is hinged at its outer end to a clamp, $m$, which is attached by a set-screw, $v'$, to ring $g$. A screw-threaded pin, $e^2$, through arm $e'$, with its lower end resting on bar $a$, is turned to adjust the position of roller $e$ above carrier $d$. A spiral spring, $n$, on pin $n'$, which extends through the slotted arm $e'$ into ring $g$, is used to adjust the pressure of roller $e$ on the kernels passing under it in slot $a'$ to cutters $c$. Slots $a'$ are inclined outward in the direction of rotation of carrier $d$, in order that the carrier may move the kernels resting on it in the bottoms of the slots in an outward direction to cutters $c$. The rotation of rollers $e$ in contact with the kernels assists in moving them outward to cutters $c$, and also prevents the inner parts of the kernels from being thrown back when the outer parts are cut off. The meal is discharged from cutters $c$ into vessel $l$. Bars $a$ are formed with an offset at cutters $c$, in order that the cutters may extend up as high as the tops of slots $a'$ to sever the kernels.

The grain is fed into hopper $h$, whose bottom surrounds the upper part of shaft $b$, and is formed with slots $s$, through which the grain passes down to feeder A. When hopper $h$ is lowered slots $s$ are closed, or partially closed, by the upper part of shaft $b$, to lessen the feed, and when the hopper is raised the feed is increased. Hopper $h$ is thus raised and lowered by means of arm $i$, which is connected with the hopper, and hinged at one end to lug $f'$, forming a part of ring $g$, and at the other end supported by spring $o$ on pin $o'$, inserted in ring $g$. The upper end of pin $o'$ is screw-threaded, and the hopper $h$ and arm $i$ are raised and lowered by turning nut $m'$ on the pin. Rollers *e* are formed with their peripheries slightly concave, to facilitate the moving of the kernels beneath the rollers to cutters *c*; but I do not deem such concave form essential.

I claim as my invention—

1. In a grain-cutting machine, a feeder formed with slots inclined to its radius, in combination with a horizontally-rotating knife-carrier provided with cutters on its periphery, substantially as described.

2. In a grain-cutting machine, a rotating knife-carrier provided with inclined cutters, in combination with rotating rollers, grooved across their peripheries for the cutters to pass through, and a slotted feeder, substantially as described.

3. The grooved rollers *e*, hung on yielding bearings, in combination with rotating carrier *d*, provided with inclined cutters *c*, and a slotted feeder, A, substantially as described.

4. The clamps *m*, arms *e'*, springs *n*, pins *n'* *e²*, and grooved rollers *e*, in combination with rotating carrier *d*, provided with inclined cutters *c*, substantially as described.

5. The feeder A, formed of recessed bars *a*, in combination with collar *k* and carrier *d*, provided with cutters *c*, substantially as described.

6. The rotating carrier *d*, provided with cutters *c*, in combination with the rotating disk *d'*, ring *w*, wedges *v*, set-screws *w'*, and the stationary slotted feeder A, substantially as described.

7. The hopper *h*, having its lower end of tubular shape, fitted to slide over the upper end of shaft *b*, and formed with vertical slots *s*, in combination with shaft *b*, substantially as described.

8. The hopper *h*, supported by and in combination with arm *i*, hinged at one end to lug *f'*, and supported at the other end on spring *o*, lugs *f'*, pin *o'*, nut *m'*, and spring *o*, substantially as described.

WILLIAM EBERHARD.

Witnesses:
JOHN G. EBERHARD,
CHARLES BAIRD.